United States Patent [19]

Lindsey

[11] 4,189,166

[45] Feb. 19, 1980

[54] SELF-PROPELLED VEHICLE

[76] Inventor: Ben Lindsey, P.O. Box 1256, Maljamar, N. Mex. 88264

[21] Appl. No.: 3,889

[22] Filed: Jan. 16, 1979

Related U.S. Application Data

[63] Continuation-in-part of Ser. No. 865,705, Dec. 29, 1977, Pat. No. 4,147,370.

[51] Int. Cl.² ............................................. B62M 1/16
[52] U.S. Cl. ................................. 280/234; 280/247
[58] Field of Search ............... 280/233, 234, 240, 244, 280/246–250

[56] References Cited

U.S. PATENT DOCUMENTS

| 125,451 | 4/1872 | Gregg | 280/248 X |
|---|---|---|---|
| 498,394 | 5/1893 | Huennekens | 280/248 X |
| 565,556 | 8/1896 | Murray | 280/234 |
| 844,319 | 2/1907 | Bollinger | 280/248 |
| 1,686,389 | 10/1928 | Martin | 280/247 X |
| 1,867,731 | 7/1932 | Clarke | 280/247 X |
| 2,123,390 | 7/1938 | Welch | 280/248 |
| 3,149,857 | 9/1964 | May | 280/247 |

FOREIGN PATENT DOCUMENTS

| 543761 | 1/1956 | Belgium | 280/248 |
|---|---|---|---|
| 24742 | 7/1919 | Denmark | 280/247 |
| 58557 | 3/1941 | Denmark | 280/247 |
| 17905 | of 1899 | United Kingdom | 280/248 |

*Primary Examiner*—Stephen G. Kunin
*Assistant Examiner*—Terrance L. Siemens
*Attorney, Agent, or Firm*—Marcus L. Bates

[57] ABSTRACT

A self-propelled vehicle in the form of a scooter. The vehicle includes a main frame having a platform relatively close to the ground upon which a person can stand. Forward and rearward wheels arranged in tandem ground support the vehicle with the front wheel being attached to a handle bar by which the vehicle is steered. The handle bars are journaled to the main frame in such a manner that they can be grasped by the hands and manipulated in a fore and aft direction in order to propel the vehicle along the ground, while at the same time lateral motion of the handle bars provides for the before mentioned steering. The handle bars are connected to the front wheel by a drive mechanism that includes an over-the-center apparatus which moves the handle bars off dead center each extreme reciprocation thereof.

11 Claims, 5 Drawing Figures

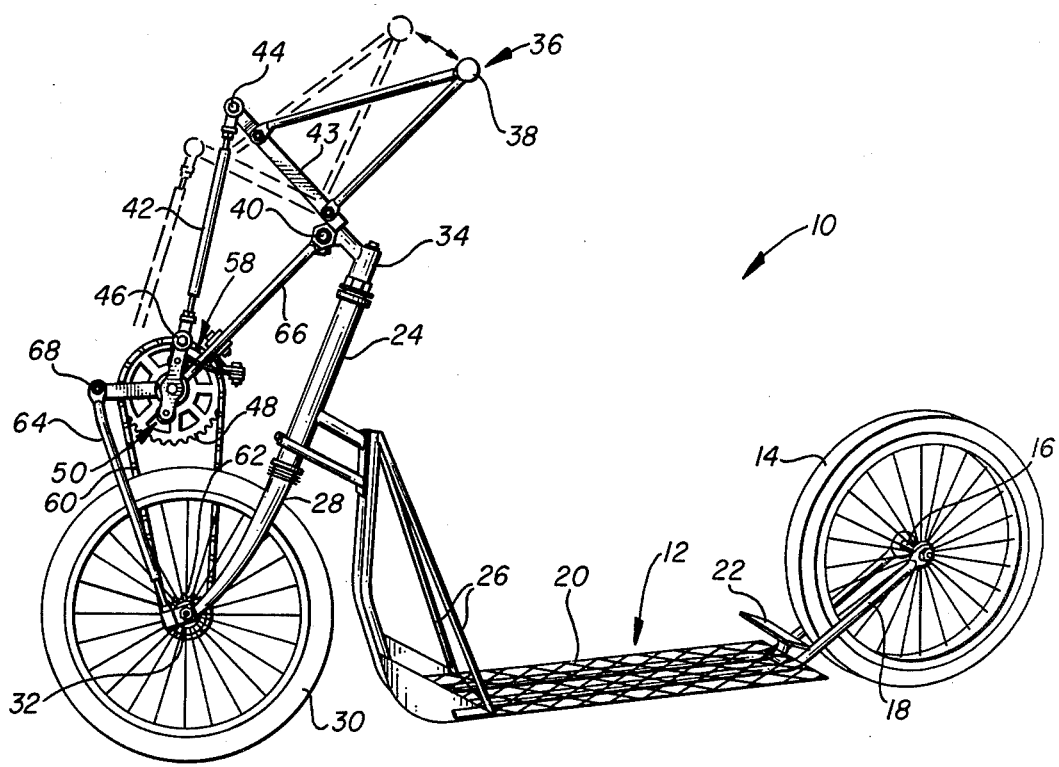
FIG. 1
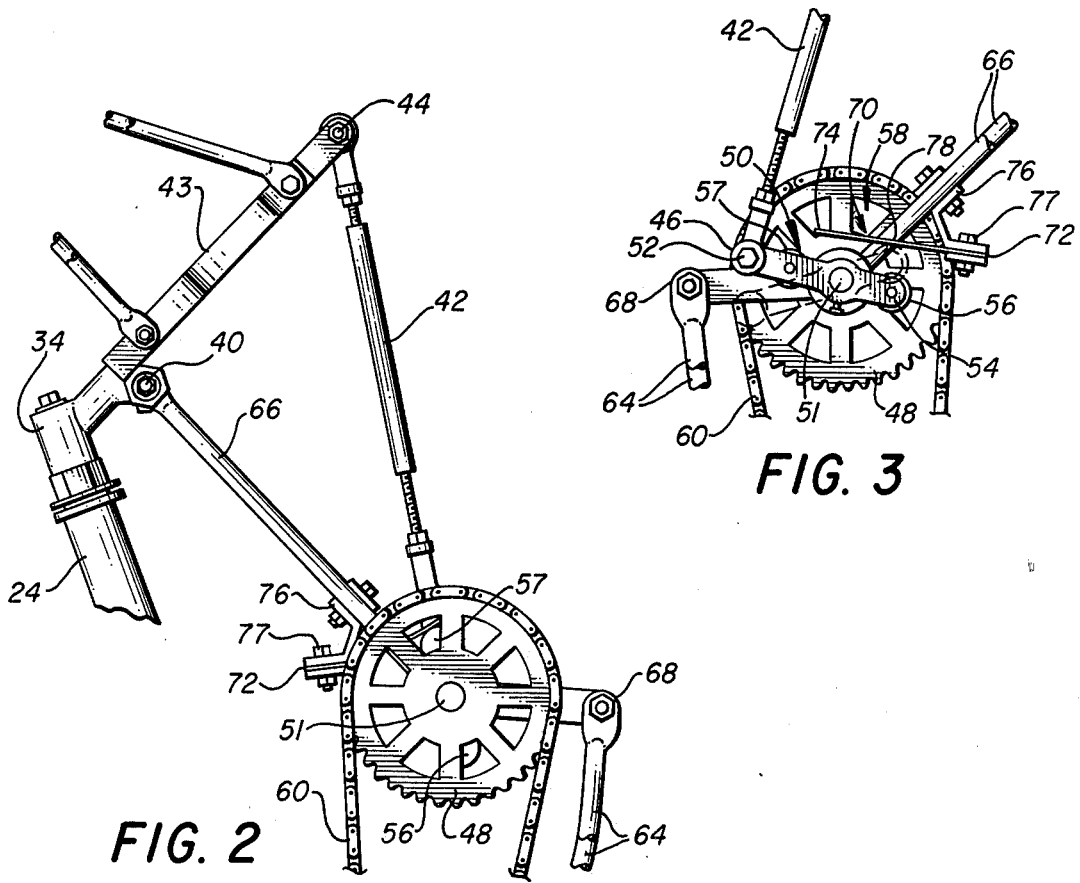
FIG. 2
FIG. 3

SELF-PROPELLED VEHICLE

RELATED PATENT APPLICATIONS

My co-pending patent application Ser. No. 865,705, filed Dec. 29, 1977, is now U.S. Pat. No. 4,147,370 issued Apr. 3, 1979 of which this patent application is a continuation-in-part.

BACKGROUND OF THE INVENTION

Riding a scooter-type vehicle is exhilarating and provides a means by which one can exercise the lower part of his anatomy as he propels himself along a roadway. This form of propulsion, however, has the disadvantage that the maximum velocity one can achieve along a level surface is limited. It would therefore be desirable to be able to take advantage of the type of drive train systems associated with a ten speed bicycle, for example, thereby enabling the scooter to be self-propelled much more efficiently.

But the only logical manner in which a scooter can be self-propelled by a drive train connected to a wheel is to use the upper torso as a source of power because when the lower torso is used for this purpose, the vehicle becomes more related to a bicycle and therefore looses its scooter characteristics.

The provision of a self-propelled front wheel drive vehicle which utilizes fore and aft motion of the upper torso in order to power a drive train associated with the vehicle provides a desirable exercise for the body, especially the upper part of the torso. It would therefore be desirable to have made available a self-propelled vehicle having an extremely low center of gravity, and means associated with the handle bars of the vehicle by which one could both guide the vehicle as well as propelling the vehicle along the ground. Such a vehicle is the subject of the present invention.

SUMMARY OF THE INVENTION

A self-propelled vehicle having a front and rear wheel arranged in tandem and supported by a main frame. The frame includes a platform positioned relatively close to the ground upon which a person can stand while using the hands and arms for steering the front wheel with a handle bar. The handle bar has means by which it can be moved fore and aft in a vertical plane while at the same time the handle bar can be moved laterally in another plane in order to steer the front wheel.

The handle bar reciprocates a connecting rod which in turn rotates a crank. The crank is connected to the front wheel by a drive means so that fore and aft movement of the handle bar imparts rotational motion into the front wheel while lateral motion of the handle bar steers the vehicle. The drive means includes a coaster device, or one-way clutch means, so that the drive mechanism free wheels during the times that power is not applied thereto.

The crank includes opposed ends which rotate about a centrally located journal, and the connecting rod interconnects the handle bar with the crank.

A spring means biasingly engages the opposed ends of the crank each 180° of rotation thereof as the rod reciprocates towards each end of its stroke, thereby storing energy into the spring means as the rod nears the end of the stroke and releasing the energy as the rod is forced over the center each reciprocation thereof. This action prevents the handle bars from inadvertently reversing the direction of rotation.

A primary object of the present invention is the provision of improvements in self-propelled vehicles.

Another object of the present invention is the provision of a self-propelled vehicle having drive means connected to the handle bars thereof which cause one of the wheels of the vehicle to rotate.

A further object of this invention is the provision of a self-propelled vehicle having a platform upon which one can stand and a drive train connected between a handle bar and a wheel thereof so that one can use the upper torso to propel the vehicle along the ground.

A still further object of this invention is the provision of a front wheel drive vehicle steered by handle bars and having a drive train associated with an over-the-center action which prevents the drive means from inadvertently reversing the direction of rotation thereof.

Another and still further object of this invention is the provision of a vehicle in the form of a scooter having a platform upon which one can stand and a drive means connected between the handle bars and a wheel thereof by which one can cause the vehicle to be propelled along the ground by manipulating the handle bars in one direction and which enables the vehicle to be steered by turning the handle bars in another direction.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a side, perspective view disclosing a self-propelled vehicle made in accordance with the present invention.

FIG. 2 is an enlarged, fragmented, side view which discloses the opposite side of the vehicle seen in FIG. 1;

FIG. 3 is an enlarged, fragmented, side view which discloses, in greater detail, part of the apparatus seen in FIG. 1;

DETAILED DESCRIPTION OF THE PREFERRED EMBODIMENT

Figure 4:
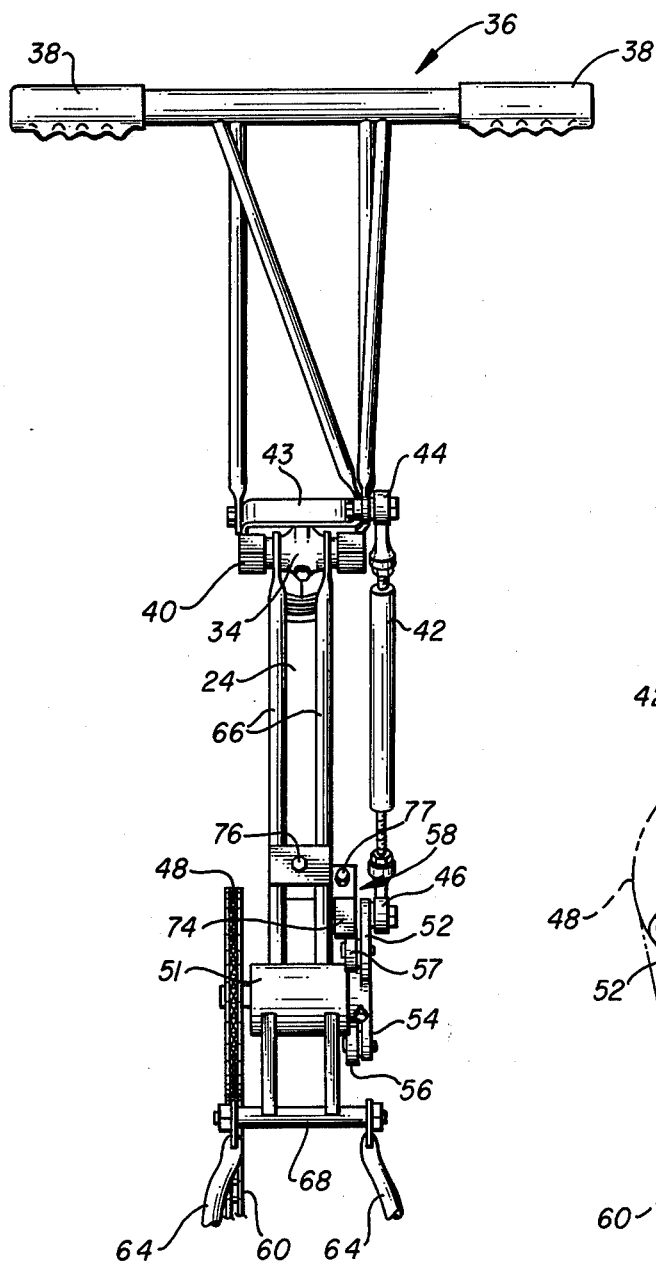
FIG. 4 is a fragmented, front view of the apparatus disclosed in FIG. 1.
Figure 5:
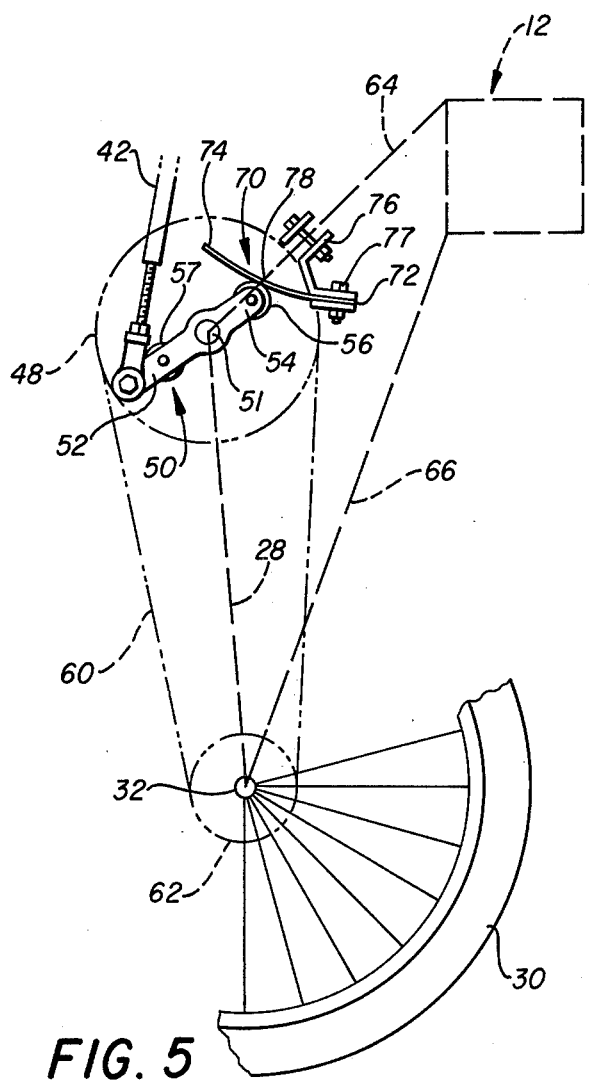
FIG. 5 is a diagrammatical representation of the present invention.

In the figures of the drawings there is disclosed a self-propelled vehicle in the form of a scooter 10. The vehicle has a main frame 12 to which there is journaled a rear wheel 14 by means of axle 16 received through the marginal free terminal end of the rear fixed fork 18. The main frame has a platform 20 upon which a person can stand while riding the vehicle.

A foot actuated brake assembly 22 is journaled to the main frame and can be brought into frictional engagement with the pneumatic tire of the rear wheel by placing part of one's weight thereupon. A support column 24 forms part of the main frame and is connected to the platform by means of frame tubes 26. A front fork 28 is journaled within the support column and can be rotated about its longitudinal axial central line. A front steering wheel 30 is journaled to the fork by means of axle 32.

Steering post 34 is connected to the front fork and to the steering handle 36. The steering handle includes handle bars 38 which can take on any number of different forms.

The steering handle is journaled at 40 to the steering post so that the steering handle can be moved in a fore and aft direction, that is, towards the front wheel and then towards the rear wheel, with the handle bar swinging in an arc about the journal 40. Connecting rod 42 is journaled at 44 to the free end of a lever arm 43. The lever arm outwardly extends from journaled relationship respective to the steering post and includes the illustrated support members by which the handle bar, steering handle, and lever are tied together to provide a triangle member having one corner thereof journaled at 40. The other end of the connecting rod is journaled at 46 to a crank 50 which turns a large sprocket 48. The large sprocket is journaled to a crank bracket 51. The crank includes opposed ends 52 and 54, respectively, to which there is journaled opposed rollers 56 and 57, respectively.

An over the center mechanism 58, the details of which will be more fully discussed later on herein, alternantly engages each of the rollers as the sprocket is turned by the cranking mechanism.

Chain 60 is meshed with the large sprocket and drives a small sprocket 62. The small sprocket is connected by a coaster brake or one way clutch to drive the front wheel in a forward direction and to coast or free wheel when rendered non-rotating.

A lower strut assembly 64 is comprised of opposed strut members connected to opposed marginal ends of the front axle, and upwardly extends into fixed relationship respective to the crank bracket. An upper strut assembly 66, comprised of parallel strut members, have one end thereof affixed to the steering post and the other remaining end affixed to the crank bracket. A forwardly directed strut spacer 68 positions the pair of struts 64 clear of the large sprocket. The resultant configuration provides a rigid forwardly directed mount for the large sprocket.

The over-the-center mechanism includes a leaf spring 70 having a fixed end 72 and a free end 74. The fixed end is attached to a bracket 76 which in turn is attached to strut members 66 by fastener means 77. A midportion 78 of the leaf spring is alternately contacted by the rollers of the crank.

In operation, the handle bar is grasped so that movement can be imparted into the steering handle in both a fore and aft direction as well as laterally moving the steering handle in another plane to impart axial rotation into the front fork assembly. One places his foot upon the platform and pushes off with the other foot while steering with the handle bars. As the vehicle moves along the ground, the handle bars are pushed in a fore and aft direction thereby causing the steering handle to reciprocate the connecting rod 42. Reciprocatory movement of the connecting rod imparts rotational motion into the crank which rotates the large sprocket. The large sprocket causes the small sprocket to rotate by means of the illustrated chain drive mechanism, while the small sprocket imparts rotation into the front wheel, thereby causing the vehicle to move along the ground.

The small sprocket is connected to the front wheel by a new departure coaster brake (T.M.) and therefore in order to force the reciprocal motion imparted into the connecting rod to continually rotate the sprocket in the same direction, the over-the-center mechanism is utilized to store energy as the rod approaches the end of its travel and to release the energy as the rod reverses direction of travel. This positive over-the-center action of the connecting rod is achieved by placing the leaf spring such that a medial marginal portion thereof is sequentially contacted and deformed by each of the rollers. Hence the leaf spring is flexed each stroke of the rod and each fore and aft movement of the handle bars. The large and small sprockets can be the same type used on a conventional ten speed bicycle and as stated above, the small sprocket is connected to the wheel by a coaster brake assembly which is available in any bicycle store.

The platform 20 is placed sufficiently close to the ground and made of a width whereby the vehicle can be parked by merely laying the vehicle over at an angle which brings one of the longitudinal edges of the platform into contact with the ground. The vehicle can be ridden by merely pushing along the ground with either of one's feet without manipulating the handle bars except for steering. Alternatively, the vehicle can be propelled along the ground by relying upon the "pumping action" of the handle bars while simultaneously moving the bars in the opposite plane in order to steer the vehicle. A combination of the foot and pumping action can also be used to propel the vehicle.

The low center of gravity of the platform imparts great stability into the vehicle. The sensation of balance is percepted through the feet causing one to inherently steer the vehicle in a manner to easily maintain the upright position. The vehicle of the present invention is especially desirable for those who find it difficult for one reason or another to pedal a conventional bicycle. Where deemed desirable, the vehicle of the present invention can be provided with two rear wheels and made into a tricycle. The vehicle of the present invention is rugged in construction, represents a practical example of transportation, and is stable in operation.

I claim:

1. A self-propelled vehicle having a main frame, a rear wheel located aft of said main frame, means by which said rear wheel is journaled to said main frame for ground supporting part of the weight of said vehicle;

a front wheel, means by which said front wheel is journaled to said main frame at a forward location thereof;

a handle, a steering means connected between said handle and said front wheel by which said handle can be used to turn said front wheel and thereby guide said vehicle;

means by which said handle can be moved fore and aft respective to said main frame while concurrently steering said front wheel;

a crank; drive means connecting said crank to said front wheel so that rotation of said crank imparts rotational motion into said front wheel, thereby propelling said vehicle along the ground; connecting rod means interconnecting said crank and said handle so that the fore and aft movement of said handle imparts rotational motion into said crank;

said crank having a central portion connected to said drive means and opposed end portions which rotate about said central portion;

biasing means positioned to contact each opposed end portion as the connecting rod is reciprocated in each direction, thereby storing energy as the rod approaches the end of its travel and releasing the energy as the rod commences to travel in the opposite direction so that the crank is forced over-the-center each reciprocation of the rod.

2. The vehicle of claim 1 wherein said steering means is a handle bar, said main frame has a support column at the forward end thereof, said front wheel having an axle, a steering fork journaled to said support column and depending downwardly into engagement with said axle so that said handle bar can steer the vehicle;

said handle bar being journaled to said support column and includes a forwardly projecting lever which actuates said connecting rod.

3. The vehicle of claim 2 wherein said main frame has a platform which extends in an upward direction at the forward end thereof into engagement with said support column, and which extends in an upward direction at the rear end thereof into engagement with said rear wheel axle, so one can stand on said platform and propel the vehicle along the ground by forcing the handle bar in a fore and aft direction while concurrently steering the vehicle by lateral movement of the handle bar.

4. The vehicle of claim 3 wherein said crank has the central portion thereof connected to rotate a sprocket, a pair of struts having one end connected to a sprocket journal, the other end connected to said main frame;

said front wheel has a clutch, a sprocket connected to said front wheel by said clutch;

and a chain by which crank sprocket drives said wheel sprocket.

5. The vehicle of claim 4 wherein said crank includes a roller at each end thereof; said biasing means is a leaf spring having a free end and a fixed end, means mounting said fixed end to the main frame with the marginal free end of said spring extending into engagement with said rollers.

6. The vehicle of claim 1 wherein said steering means is a handle bar, said main frame has a support column at the forward end thereof, said front wheel having an axle, a steering fork journaled to said support column and depending downwardly into engagement with said axle; said handle bar being journaled to said support column so that lateral movement of said handle bar can steer the vehicle;

said crank has a roller at each end; said biasing means is a leaf spring having a free end and a fixed end, means mounting said fixed end to said main frame with the marginal free end thereof engaging said rollers each 180° of rotation thereof.

7. The vehicle of claim 1 and further including a large sprocket, journal means supporting said large sprocket from said steering means, said crank has the central portion thereof connected to rotate said large sprocket; a clutch means, a small sprocket, chain means connecting the large and small sprockets together; said clutch means connecting said front wheel to said small sprocket to drive said front wheel in a forward direction only;

said crank has roller mounted at each end thereof; said biasing means is a leaf spring having a free end and a fixed end, means mounting said fixed end to the main frame with the marginal free end thereof engaging the rollers each reciprocation of the connecting rod.

8. The vehicle of claim 1 wherein said crank has rollers at each end; said biasing means is a leaf spring having a free end and a fixed end, means mounting said fixed end to said main frame with the marginal free end positioned to engage said rollers as said crank is actuated by said steering means.

9. In a self-propelled vehicle having a rear wheel, a platform relatively close to the ground upon which a person can stand while steering a front wheel with a handlebar, the improvements comprising:

said handle bar having means by which it can be moved fore and aft while at the same time said handle bar can be laterally rotated in order to steer the front wheel;

a crank means, drive means connecting said crank to drive the front wheel, said crank means having opposed ends which rotate about a centrally located journal, a connecting rod interconnecting the handlebar with the crank means so that fore and aft movement of the handle bar reciprocates the connecting rod and imparts rotational motion into the crank;

spring means biasingly engaging said opposed ends as said rod reciprocates towards the end of a stroke;

so that as the handle bars are moved fore and aft, the crank means is forced over-the-center towards the end of each fore and aft movement of the handle bars.

10. The improvement of claim 9 wherein said crank includes means by which the central portion thereof is connected to rotate a crank sprocket;

a clutch means, said front wheel has wheel sprocket connected thereto by said clutch means, and a chain by which crank sprocket drives said wheel sprocket.

11. The improvement of claim 10 wherein said crank has rollers positioned at each end in spaced relationship to said central portion; said biasing means is a leaf spring having a free end and a fixed end, means mounting said fixed end respective to said handle bar with the marginal free end thereof engaging the rollers as the crank is rotated.

* * * * *